US008977726B2

(12) United States Patent
Kumbalimutt

(10) Patent No.: US 8,977,726 B2
(45) Date of Patent: *Mar. 10, 2015

(54) LOGICAL NETWORKS

(71) Applicant: Microsoft Corporation, Redmond, WA (US)

(72) Inventor: Vishwajith Kumbalimutt, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/714,230

(22) Filed: Dec. 13, 2012

(65) Prior Publication Data

US 2013/0103809 A1 Apr. 25, 2013

Related U.S. Application Data

(63) Continuation of application No. 12/895,459, filed on Sep. 30, 2010, now Pat. No. 8,335,841.

(51) Int. Cl.
*G06F 15/173* (2006.01)
*G06F 15/177* (2006.01)
*H04L 12/24* (2006.01)
*H04L 12/46* (2006.01)

(52) U.S. Cl.
CPC ........ *H04L 41/0803* (2013.01); *H04L 12/4641* (2013.01); *H04L 41/5054* (2013.01)
USPC ............ 709/220; 709/221; 709/222; 709/224

(58) Field of Classification Search
USPC ......... 709/203, 223, 236, 225, 220, 221, 222, 709/224; 370/310, 389, 392, 255, 466
See application file for complete search history.

(56) References Cited

U.S. PATENT DOCUMENTS

| | | | |
|---|---|---|---|
| 6,085,238 A | 7/2000 | Yuasa et al. | |
| 6,944,183 B1 * | 9/2005 | Iyer et al. | 709/225 |
| 7,469,298 B2 * | 12/2008 | Kitada et al. | 709/236 |
| 7,684,392 B2 | 3/2010 | Saito et al. | |
| 7,693,044 B2 | 4/2010 | Jha et al. | |
| 7,746,873 B2 | 6/2010 | Saito et al. | |
| 7,865,586 B2 | 1/2011 | Cohn | |
| 7,937,438 B1 * | 5/2011 | Miller et al. | 709/203 |
| 8,018,873 B1 | 9/2011 | Kompella | |
| 8,046,480 B2 | 10/2011 | Cohn | |
| 8,335,841 B2 | 12/2012 | Kumbalimutt | |
| 2002/0172207 A1 | 11/2002 | Saito et al. | |

(Continued)

OTHER PUBLICATIONS

"Configuring VLANs", Apr. 18, 2005, 1-28.

(Continued)

*Primary Examiner* — Quang N Nguyen
(74) *Attorney, Agent, or Firm* — Jim Sfekas; Kate Drakos; Micky Minhas

(57) ABSTRACT

An invention is provided for creating logical network abstractions of physical networks, and deploying computer services to physical networks based on a specified logical network. In an embodiment, a physical network is divided into one or more logical networks. Upon receiving an indication to deploy a computer service to a logical network, a mapping from that logical network to a sub-network of the physical network is determined, the service is configured to execute on the sub-network of the physical network, and an indication of this configuration of the service is stored.

14 Claims, 10 Drawing Sheets

(56) References Cited

U.S. PATENT DOCUMENTS

| | | | |
|---|---|---|---|
| 2005/0025071 A1 | 2/2005 | Miyake et al. | |
| 2005/0044199 A1* | 2/2005 | Shiga et al. | 709/223 |
| 2005/0180345 A1* | 8/2005 | Meier | 370/310 |
| 2006/0209760 A1 | 9/2006 | Saito et al. | |
| 2010/0061366 A1* | 3/2010 | DelRegno et al. | 370/389 |
| 2010/0128639 A1* | 5/2010 | Dehaan et al. | 370/255 |
| 2010/0153532 A1 | 6/2010 | Ozawa et al. | |
| 2010/0272107 A1* | 10/2010 | Papp et al. | 370/392 |

OTHER PUBLICATIONS

"High Availability with Cisco Active Network Abstraction", White Paper, Cisco, 2007, 1-5.

"HP Virtual Connect technology for the HP BladeSystem c-Class", Technology Brief, 4$^{th}$ Edition, HP, Jan. 2010, 1-18.

"Network Services Virtualization", White Paper, Cisco, 2009, 1-8.

"Virtual Fabrics", www.brocade.com-products-solutions-technology-architecture-platforms-fabric-os-virtual_fabrics.page, accessed Jul. 19, 2010, 2 pages.

* cited by examiner

| Logical Network | Location | VLAN IDs |
|---|---|---|
| CORP | REDMOND | 1-20 |
| | PHOENIX | 30-40 |
| | DALLAS | 50-60 |
| EXT-A | REDMOND | 100, 101 |
| EXT-B | PHOENIX | 200, 201 |
| PROVISONING | REDMOND | 23 |
| MANAGEMENT | REDMOND | 24 |

FIG. 3

LOGICAL NETWORKS

CROSS REFERENCE TO RELATED APPLICATIONS

This application is a continuation of U.S. patent application Ser. No. 12/895,459 filed on Sep. 30, 2010, entitled "LOGICAL NETWORKS," issued as U.S. Pat. No. 8,335,841 on Dec. 18, 2012, the entire contents of which are incorporated herein by reference.

BACKGROUND

A datacenter may comprise many aspects—such as INTERNET Protocol (IP) addresses of components that connect to the datacenter, and subnets within the datacenter. Each of these aspects may need to be configured for the datacenter to function as desired. There are applications that are deployed over all or part of a datacenter. An application may be deployed based on its network requirements. Applications and services are increasingly distributed in nature and involve complex topologies with multiple hosts, load balancers, firewalls, and extranet components involved. Deploying complex applications may be effectuated by a process that supports operations such as creating virtual networks, setting options for VLAN tagging, binding to virtual switches, and binding to physical network interface cards (NICs). This process may be, for instance the MICROSOFT System Center Virtual Machine Manager (SCVMM).

A typical scenario for deploying an application in a datacenter (a data center comprising computing, network, and storage resources) involves the work of both a network administrator—who is responsible for configuring the datacenter—and server administrator—who is responsible for deploying the application upon that configured datacenter. A successful application deployment is based on the cooperative work between a server administrator and a network administrator. Further, once deployed within a given datacenter commonly referred to as a site, the administrators may desire to move the application to another site. A site is typically a physical location within a data center that is either in its own building or a section of a building with its own power, cooling, storage, networking, etc. A data center typically comprises multiple sites to provide redundancy. Geographic locations of user populations also determine site locations. A resource group is a logical entity within a site that comprises hosts, infrastructure such as storage, and networking Dynamic migration of VMs is commonly constrained to occurring within a resource group. A service is an application that comprises a set of VMs, and the associated infrastructure, such as networking and storage. A service can be distributed across multiple resource groups and sites.

There are many problems with current techniques for deploying applications on datacenters, including sites, some of which are well known.

SUMMARY

It would therefore be an improvement to provide better techniques for deploying applications on datacenters. A common scenario occurs where administrators for a server of the datacenter view networking capability as a utility like electrical power, and do not appreciate what an application of the server needs from a network standpoint. Further, even if the server administrator did appreciate what an application needs from a network standpoint, that server administrator may not be able to describe those needs in a way that an administrator of the datacenter could understand and translate to his paradigm. Such a scenario may result in long lead times required to deploy applications in a datacenter and many rounds of discussions between the server administrator and network administrator to get the networking requirements for the application in place.

These problems associated with deploying applications on datacenters may be alleviated by establishing a concept of logical networks—abstractions over the network fabric that a server admin may use without needing to know the underlying details of the network, including subnets and virtual local area networks (VLANs). Then, these logical network specifications may be mapped to the actual network specifications and implemented for the application. Further, when a given application is deployed to different sites within a datacenter, the logical network itself does not change, but the mapping of that logical network to the underlying network fabric will change based on the networking resources available on the datacenter site.

This invention may be implemented in the opposite direction. That is, a network administrator may configure the subnets and VLANs of a network, and map those actual network specifications to logical network specifications. These mappings of actual network specifications to logical network specifications may occur on a per site basis (or with an even finer granularity within the datacenter), so that different sets of network specifications within a datacenter all map to a single set of logical network specifications.

VLANs offer benefits. VLANs allow for a datacenter to be segmented for purposes such as isolation, performance, and security. VLANs enable traffic to be routed to different segments of a datacenter based on service level agreements (SLAs—agreements that define performance metrics that will be adhered to for a given service). VLANs also enable traffic to be isolated so that a problem component cannot take down an entire datacenter.

In an embodiment, the layout of a physical network is determined. The layout of a physical network may be determined, for instance, by querying the routers of the physical network to determine which host computers are connected to a router, and which ports those host computers are connected to the router on. Thus, host computers may be identified along with their ability to communicate with various other computers and datacenters.

Based on this determination of the layout of the physical network, one or more logical networks may be established. A logical network sets forth network resource availability independent of the underlying physical network layout. For instance, a logical network may provide access to the INTERNET, or to back-end components, such as a shared database. When an application is deployed to a given logical network, that logical network is processed and mapped to its physical network equivalent, then the application is deployed to that physical network equivalent.

The relationship between a logical network and a physical network may vary among different sites. For instance, the Redmond\PRODUCTION site and the Phoenix\PRODUCTION site may both be the same logical network—PRODUCTION—but the implementation of that logical network in the different datacenters may vary. That is, the underlying physical network attributes, such as subnetwork IP address ranges and VLAN IDs may be different. The relationship between a logical network and a physical network may also vary among two sites within a datacenter, even though a single application may be deployed in either site. For instance, the underlying physical network attributes of Phoenix\TEST and Phoenix\PRODUCTION may differ.

Thus, when an application deployment is moved as between locations or even within a datacenter, this may be done independent of the difference of the underlying physical characteristics.

It can be appreciated by one of skill in the art that one or more various aspects of the invention may include but are not limited to circuitry and/or programming for effecting the herein-referenced aspects of the present invention; the circuitry and/or programming can be virtually any combination of hardware, software, and/or firmware configured to effect the herein-referenced aspects depending upon the design choices of the system designer.

The foregoing is a summary and thus contains, by necessity, simplifications, generalizations and omissions of detail. Those skilled in the art will appreciate that the summary is illustrative only and is not intended to be in any way limiting.

BRIEF DESCRIPTION OF THE DRAWINGS

The systems, methods, and computer-readable media for creating logical networks and mapping logical networks to physical networks are further described with reference to the accompanying drawings in which:

FIG. 3 depicts a set of logical networks built upon the physical networks depicted in FIG. 2. A logical network is based on a grouping of VLANs.

DETAILED DESCRIPTION OF ILLUSTRATIVE EMBODIMENTS

Figure 1:
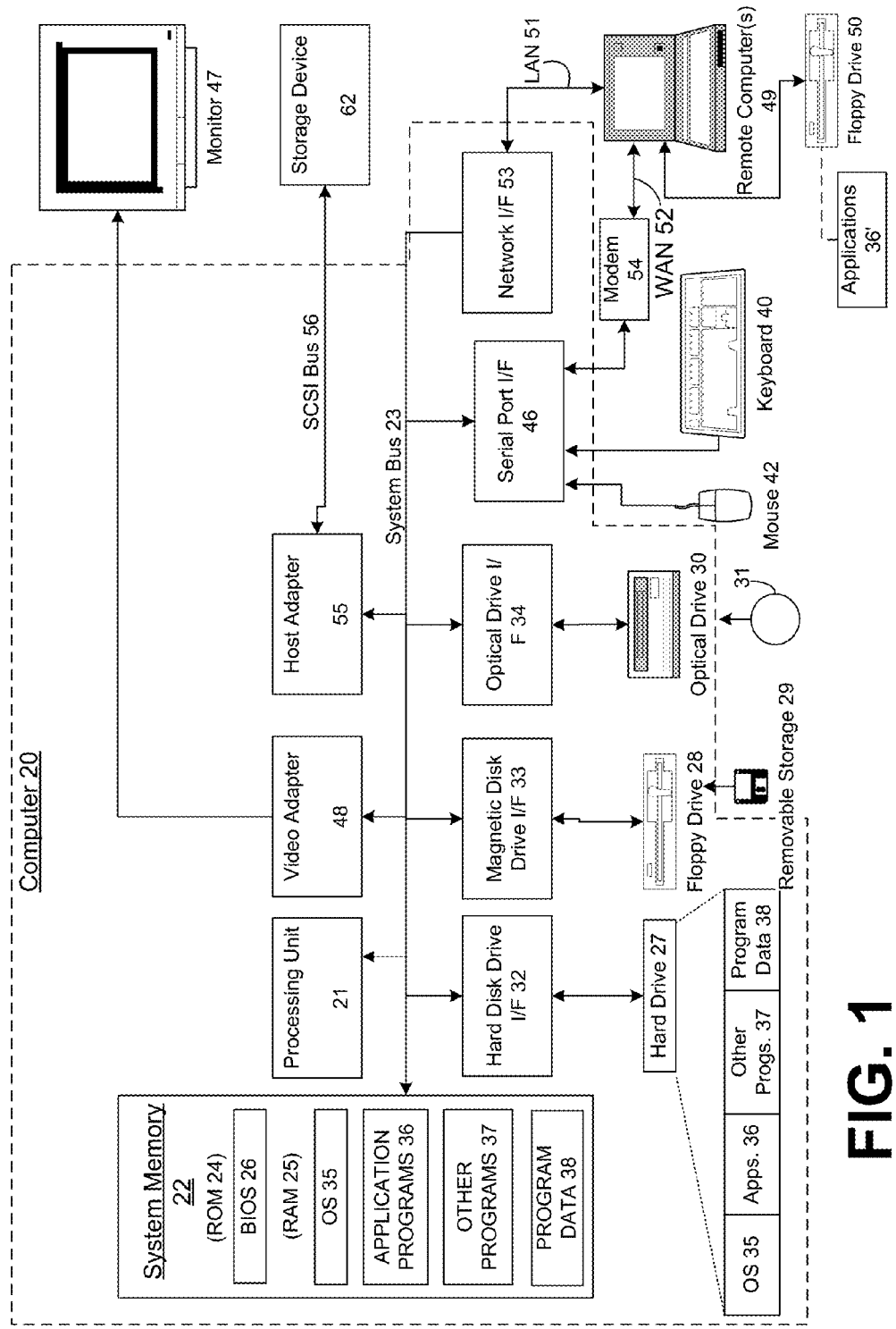
FIG. 1 depicts an example general purpose computing environment in which in which the invention described herein may be embodied.

Embodiments may execute on one or more computer systems. FIG. 1 and the following discussion are intended to provide a brief general description of a suitable computing environment in which the disclosed subject matter may be implemented.

The term processor used throughout the description can include hardware components such as hardware interrupt controllers, network adaptors, graphics processors, hardware based video/audio codecs, and the firmware used to operate such hardware. The term processor can also include microprocessors, application specific integrated circuits, and/or one or more logical processors, e.g., one or more cores of a multi-core general processing unit configured by instructions read from firmware and/or software. Logical processor(s) can be configured by instructions embodying logic operable to perform function(s) that are loaded from memory, e.g., RAM, ROM, firmware, and/or mass storage.

Referring now to FIG. 1, an exemplary general purpose computing system is depicted. The general purpose computing system can include a conventional computer 20 or the like, including at least one processor or processing unit 21, a system memory 22, and a system bus 23 that communicative couples various system components including the system memory to the processing unit 21 when the system is in an operational state. The system bus 23 may be any of several types of bus structures including a memory bus or memory controller, a peripheral bus, and a local bus using any of a variety of bus architectures. The system memory can include read only memory (ROM) 24 and random access memory (RAM) 25. A basic input/output system 26 (BIOS), containing the basic routines that help to transfer information between elements within the computer 20, such as during start up, is stored in ROM 24. The computer 20 may further include a hard disk drive 27 for reading from and writing to a hard disk (not shown), a magnetic disk drive 28 for reading from or writing to a removable magnetic disk 29, and an optical disk drive 30 for reading from or writing to a removable optical disk 31 such as a CD ROM or other optical media. The hard disk drive 27, magnetic disk drive 28, and optical disk drive 30 are shown as connected to the system bus 23 by a hard disk drive interface 32, a magnetic disk drive interface 33, and an optical drive interface 34, respectively. The drives and their associated computer readable media provide non volatile storage of computer readable instructions, data structures, program modules and other data for the computer 20. Although the exemplary environment described herein employs a hard disk, a removable magnetic disk 29 and a removable optical disk 31, it should be appreciated by those skilled in the art that other types of computer readable media which can store data that is accessible by a computer, such as flash memory cards, digital video disks, random access memories (RAMs), read only memories (ROMs) and the like may also be used in the exemplary operating environment. Generally, such computer readable storage media can be used in some embodiments to store processor executable instructions embodying aspects of the present disclosure.

A number of program modules comprising computer-readable instructions may be stored on computer-readable media such as the hard disk, magnetic disk 29, optical disk 31, ROM 24 or RAM 25, including an operating system 35, one or more application programs 36, other program modules 37 and program data 38. Upon execution by the processing unit, the computer-readable instructions cause the actions described in more detail below to be carried out or cause the various program modules to be instantiated. A user may enter commands and information into the computer 20 through input devices such as a keyboard 40 and pointing device 42. Other input devices (not shown) may include a microphone, joystick, game pad, scanner or the like. These and other input devices are often connected to the processing unit 21 through a serial port interface 46 that is coupled to the system bus, but may be connected by other interfaces, such as a parallel port, game port or universal serial bus (USB). A display 47 or other type of display device can also be connected to the system bus 23 via an interface, such as a video adapter 48. In addition to the display 47, computers typically include other peripheral output devices (not shown), such as speakers and printers. The exemplary system of FIG. 1 also includes a host adapter 55, Small Computer System Interface (SCSI) bus 56, and an external storage device 62 connected to the SCSI bus 56.

The computer 20 may operate in a networked environment using logical connections to one or more remote computers, such as a remote computer 49. The remote computer 49 may be another computer, a server, a router, a network PC, a peer device or other common network node, and typically can include many or all of the elements described above relative to the computer 20, although only a memory storage device 50 has been illustrated in FIG. 1. The logical connections depicted in FIG. 1 can include a local area network (LAN) 51 and a wide area network (WAN) 52. Such networking environments are commonplace in offices, enterprise wide computer networks, intranets and the INTERNET.

When used in a LAN networking environment, the computer 20 can be connected to the LAN 51 through a network interface or adapter 53. When used in a WAN networking environment, the computer 20 can typically include a modem 54 or other means for establishing communications over the wide area network 52, such as the Internet. The modem 54, which may be internal or external, can be connected to the system bus 23 via the serial port interface 46. In a networked environment, program modules depicted relative to the computer 20, or portions thereof, may be stored in the remote memory storage device. It will be appreciated that the network connections shown are exemplary and other means of establishing a communications link between the computers may be used. Moreover, while it is envisioned that numerous embodiments of the present disclosure are particularly well-suited for computerized systems, nothing in this document is intended to limit the disclosure to such embodiments.

Figure 2:
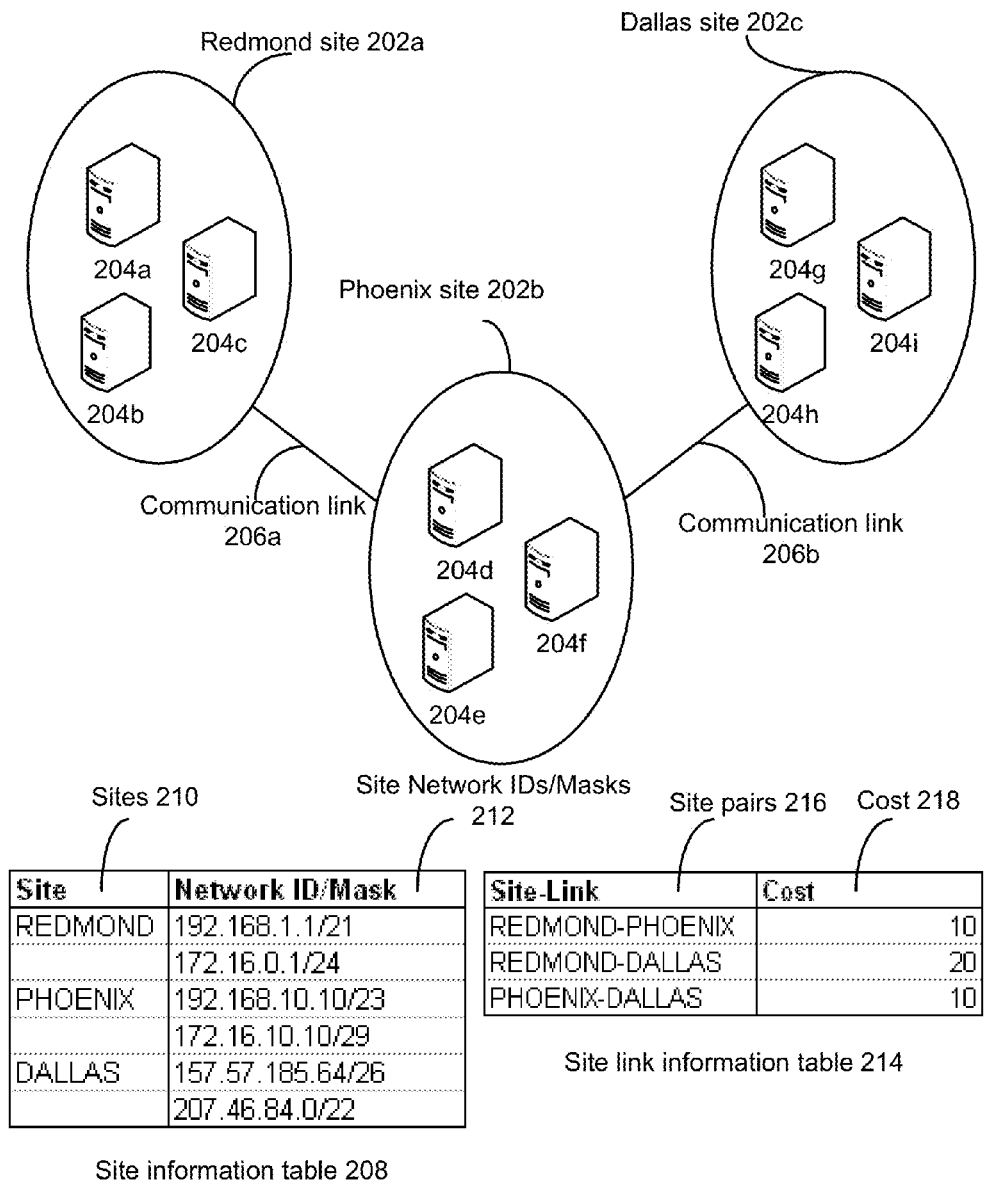
FIG. 2 depicts an example of inter-connected sites that may be discovered and used to implement the present invention.

FIG. 2 depicts an example of inter-connected sites that may be discovered and used to implement the present invention. The sites may comprise computers similar to computer 20 of FIG. 1. Depicted are three sites 202—Redmond 202a, Phoenix 202b, and Dallas 202c. Each site 202 comprises one or more computers 204. A site may also comprise such infrastructure as load balancers and storage. The sites are inter-connected through communication link 206. As depicted, Redmond 202a and Phoenix 202b have a direct communication link, communication link 206a. Likewise, Phoenix 202b and Dallas 202c have a direct communication link 206b. Redmond 202a and Dallas 202c do not have a direct communication link. Communication between Redmond 202a and Dallas 202c passes through Phoenix 202b—through both communication link 206a and communication link 206b.

Site information may be discovered such as by using a directory access protocol, such as Lightweight Directory Access Protocol (LDAP). MICROSOFT's Active Directory comprises an implementation of LDAP. Via a directory access protocol, a list of sites and each site's corresponding INTERNET Protocol (IP) address ranges may be determined. This discovery of sites 202 and components of sites may be performed periodically, so as to keep an up to date accounting of the sites 202 and their components.

In a scenario where sites are discovered via a directory access protocol implementation, the directory access protocol implementation may, in response to a request, provide a list of directory access protocol implementation-discovered sites and their associated IP address or IP address ranges. For each directory access protocol implementation-discovered site, the directory access protocol implementation provides a name for that site. That provided name may be used, or the site may be renamed, and the link between the name and the site may be maintained even after the name changes. The directory access protocol implementation may be further used to keep these sites up to date based on changes to the sites in Active Directory. This may be done, such as by setting the directory access protocol implementation to refresh periodically, such as by configuring the "Site Refresh Interval" parameter to a value such as "refresh every day."

In discovering site information, a table of site information such as table 208 may be produced. Table 208 comprises a list of discovered sites 210, along with a corresponding network ID(s) and mask(s) for each discovered site 212. As depicted, Redmond 202a, Phoenix 202b, and Dallas 202c are represented among the sites listed in column 210 of table 210. Redmond 202a has multiple network ID and mask pairs identified (as does Phoenix 202b and Dallas 202c)

In discovering site information, site link information may also be discovered, such as through a directory access protocol implementation. This may be stored such as in table 214, which depicts pairs of sites in column 216 and the corresponding cost of communication between those sites in column 218. As depicted, communicating between Redmond 202a and Phoenix 202b via communication link 206a has a cost of 10 (this may be a relative cost or an absolute cost, such as a measurement of time), communication between Phoenix 202b and Dallas 202c has a cost of 10 via communication link 206b, and communication between Redmond 202a and Dallas 206c has a cost of 20 (as it must travel via both communication link 206a and 206b, each of which has a cost of 10). This discovered information about inter-connected sites may be used to configure datacenters within each site and across multiple sites.

Site information may also be obtained in other ways, such through user input indicative of site information, or through input of a file that indicates site information, such as a comma-separated value (CSV) file that contains entries for sites, such as the entry "Redmond 192.168.48.0/24" which indicates that there is a Redmond site, and it uses the subnet 192.168.48.0/24.

FIG. 3 depicts a set of logical networks built upon the physical networks depicted in FIG. 2. A logical network is based on a grouping of VLANs. A logical network enables a network administrator to create networks aligned to business needs rather than the physical arrangement of a site. A logical network is an abstraction of that physical arrangement that provides flexibility for a network administrator to group VLANs.

Table 302 comprises columns with entries for a logical network name 304, a location 306, and VLAN IDs 308. As depicted in table 302, a logical network is divorced from the underlying network IDs and masks. As depicted, there are five logical network names in column 304—CORP, EXT-A, EXT-B, PROVISIONING, and MANAGEMENT. Each logical network in column 304 corresponds to one or more location/VLAN IDs pairs in columns 306 and 308. For instance, the CORP logical network exists in the Redmond site 202a with VLAN IDs 1-22, in the Phoenix site 202b with VLAN IDs 30-40, and the Dallas site 202c with VLAN IDs 50-60.

The existence of the CORP logical network in each of the Redmond 202a, Phoenix 202b and Dallas 202c sites shows that a logical network may be present in multiple sites with different VLAN mappings. This is because, while network infrastructure may vary from site to site, the abstraction of the logical network holds across sites. This enables a scenario where an administrator may create a service or application to exist on a logical network, and when that application is migrated from one site to another, the site may remain on the same logical network, even though the VLAN ID it uses has changed. Even though the underlying network infrastructure may change, the intent of the administrator is still effectuated.

In a common scenario, network infrastructure is shared across a site, so logical networks are created on a per site basis. This creation of logical networks on a per site basis enables all resource groups within the site to use the logical networks of that site. It may be appreciated that there are embodiments of sites where network infrastructure is not shared across a site, and that the present invention may also be used in these types of networks. In this scenario, all resource groups within a given site can use the logical network(s) that are part of the site that they belong to.

Figure 4:
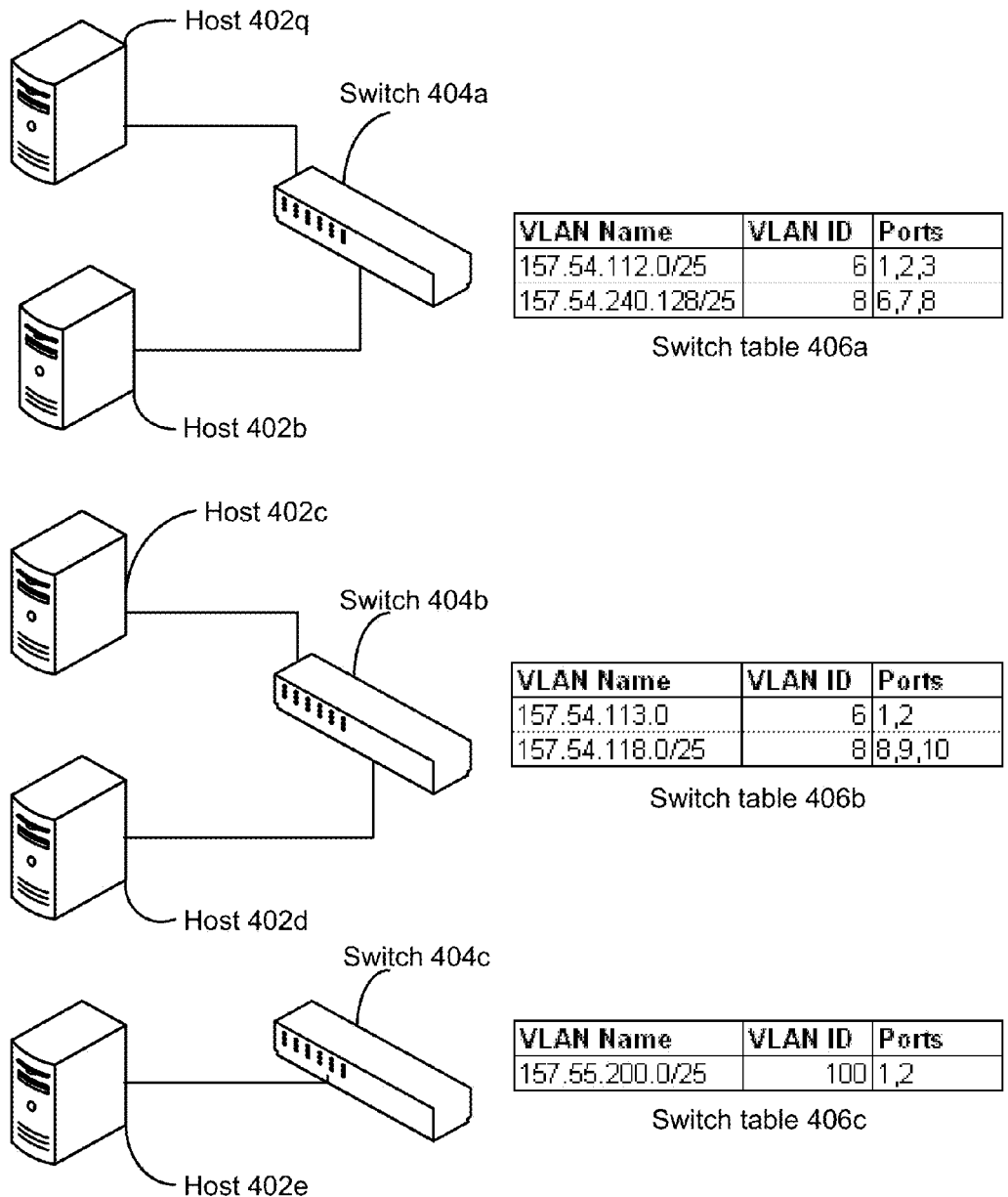
FIG. 4 depicts network infrastructure from which a table of hosts may be determined.

FIG. 4 depicts network infrastructure from which a table of hosts may be determined, and used to create logical networks, such as those depicted in FIG. 3. When hosts are discovered on a network, such as depicted in FIG. 2, they may be assigned to sites based on their IP addresses, and may further be placed in an "unassigned" resource group within the site the host belongs to. They may later be assigned to a resource group for a particular logical network. Using network discovery capabilities, not only hosts may be discovered, but also the physical switches that they are connected to. This discovery may be performed based on the MAC addresses of the NIC(s) on the host using network data such as forwarding databases, spanning tree protocol (STP), and Cisco Discovery Protocol (CDP)—a Data Link Layer network protocol implemented in some networking equipment used to share information that equipment.

As depicted, host 402a and host 402b are connected to switch 404a on port 1, switch 404a having VLAN IDs 6 and 8 available. Host 402c and host 402d are connected to switch 404b on port 2, switch 404a having VLAN IDs 6 and 8 available. Host 402e is connected to switch 404b on port 3, switch 404b having VLAN ID 100 available.

Figure 5:
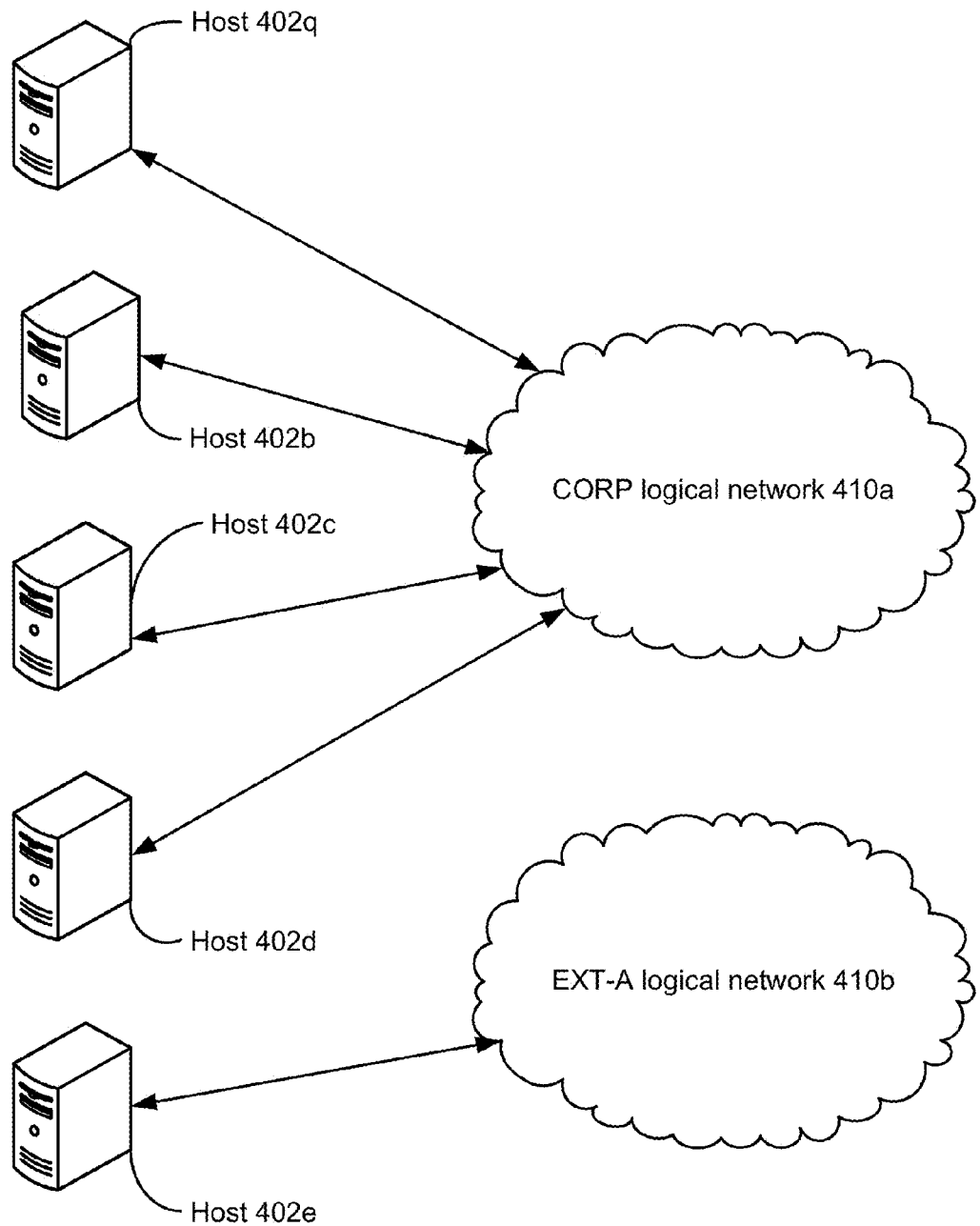
FIG. 5 depicts the hosts of FIG. 4 as mapped to logical networks.

FIG. 5 depicts the hosts of FIG. 4 as mapped to logical networks, such as the logical networks depicted in FIG. 3. Hosts 402a-d are mapped to the CORP logical network 410a, and host 402e is mapped to the EXT-A logical network 410b. This information of how hosts map to logical networks is used during the placement of applications and services, where an application needs to be deployed to an appropriate set of hosts based on the logical network assignments.

This mapping of hosts to logical networks and provisioning of those hosts may be performed based on the network infrastructure determined in FIG. 4 and the logical network table of FIG. 3. Hosts may be automatically provisioned with information such as the site 202 of a host, the host's IP address and MAC address, the switch's IP address, the port that the host communicates on, the port mode of that port, the logical network of which the host is a member, the default VLAN ID of the host, and the possible VLAN ID assignments of the host. Then, based on the particulars of an associated switch, such as the switch's vendor, model number and version number, the hosts may be provisioned.

A physical switch port may be configured to be either access mode or trunk mode. Since a VM connects to a physical switch via a virtual switch, the physical switch port needs to be configured for trunk mode to allow multiple VLANs to traverse over the same port. In doing so, packets may then be tagged with any of the available VLAN IDs for that switch port before those packets are sent to the switch. If a physical switch port is configured for access mode, then only one VLAN is allowed. In this case, packets may not be tagged with any of the available VLAND IDs before the packet has been sent to the switch.

A load balancer distributes network traffic among two or more network resources, such as hosts and switches. Common load balancers are the F5 BigIP, the CITRIX Netscaler, and the CISCO Redirector. Load balancers may be discovered in a fashion similar to how other network components are discovered. Information about load balancers that may be discovered includes the corresponding site 202, the load balancer's IP address, the load balancer's vendor, and the load balancer's model number. Load balancers may be configured such as through the use of Powershell commandlets to manage the devices.

A virtual IP address (VIP) is configured when a new service is deployed. The parameters used in VIP configuration include the IP address of the load balancer, the name of the VIP table, the IP address of the VIP, the port of the VIP, the type (which determines how to distribute the load, such as round robin—which distributes requests equally by picking each host in order—and least load—which picks the host that has the least number of connections), persistence—whether all requests from one IP address are routed to the same host (if so, this may override the type of load balancing), the number of servers being added, the IP address and port of each sever, and administrator credentials necessary to validate the changes.

A VIP may be created in the load balancer using the following parameters from above: the IP address of the load balancer, the VIP name, the VIP IP, the VIP port, the type, the persistence, and the credentials. A server may also be added to the VIP table using the following parameters from above— the IP address of the load balancer, the VIP name, the server IP address, and the server port.

Figure 6:
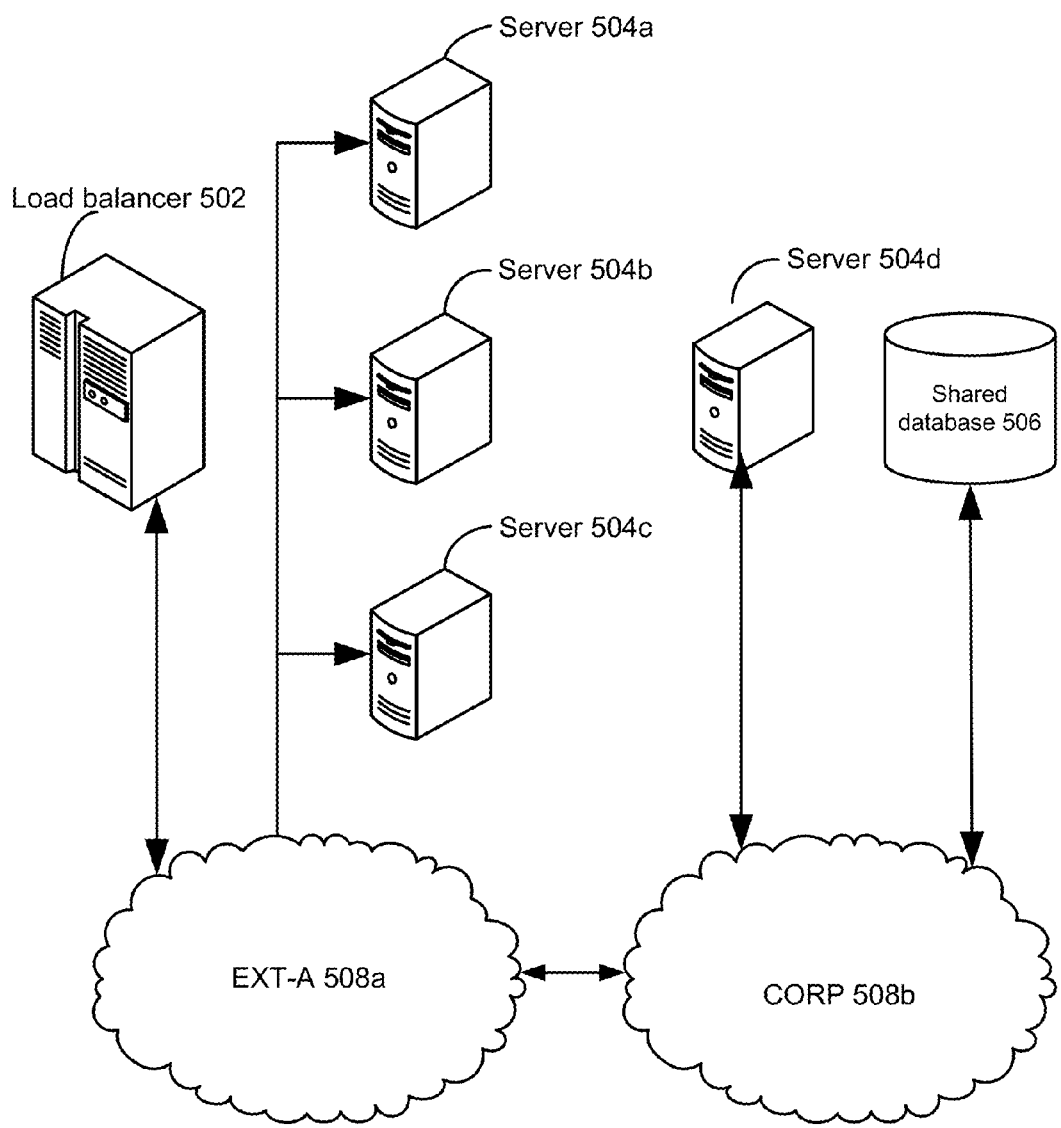
FIG. 6 depicts an example arrangement of network components of a physical network (as depicted in FIGS. 4-5) as arranged into a service template for a service that is built on logical network abstractions of the physical network.

With the network infrastructure being established as depicted in FIGS. 4-5, a service template may be created. FIG. 6 depicts an example arrangement of network components of a physical network (as depicted in FIGS. 4-5) as arranged into a service template for a service that is built on logical network abstractions of the physical network. The front end servers may be configured to use a web service workload—a workload that corresponds to a workload expected in use as a web server—and the back end may be configured to use a LOB workload. The front end servers may be connected to the EXT-A logical network, which is accessible via the INTERNET. The back end servers may be connected to the CORP logical network since they should be inside of the corporate intranet. A load balancer may also be added to the front of the service to distribute the load among the front end servers. A load balancer may be placed in a service template and connected to the EXT-A logical network. The load balancer may be set to have a public IP address so that it is accessible from the INTERNET, and the other servers may be set with private IP addresses. The service may also require access to a shared database resource. This shared database may be connected to the CORP logical network.

An administrator may be presented with a graphical user interface (GUI) for performing the tasks of FIG. 6. For instance, if an administrator determines that a service should comprise a load balancer on the EXT-A logical network, he may drag an icon for load balancer 502 into a window where the representation of EXT-A 508a is present, and draw an arrow that connects load balancer 502 with EXT-A 508a. A system may parse this visual representation of a service deployment created by the administrator, and determine from it that, for example, a load balancer is to be made available on the EXT-A logical network.

As part of creating a service template, policies may be set forth that determines how a service is deployed. For instance, a policy may set forth a rule that front end servers within a given site do not run on a single host. These policies may be checked and adhered to in deploying a service. Another policy may be that a machine connected to the CORP logical network cannot also be connected to the EXT-A network to prevent packets from bypassing firewall rules that the packets would be subject to were they send across a network.

Figure 7:
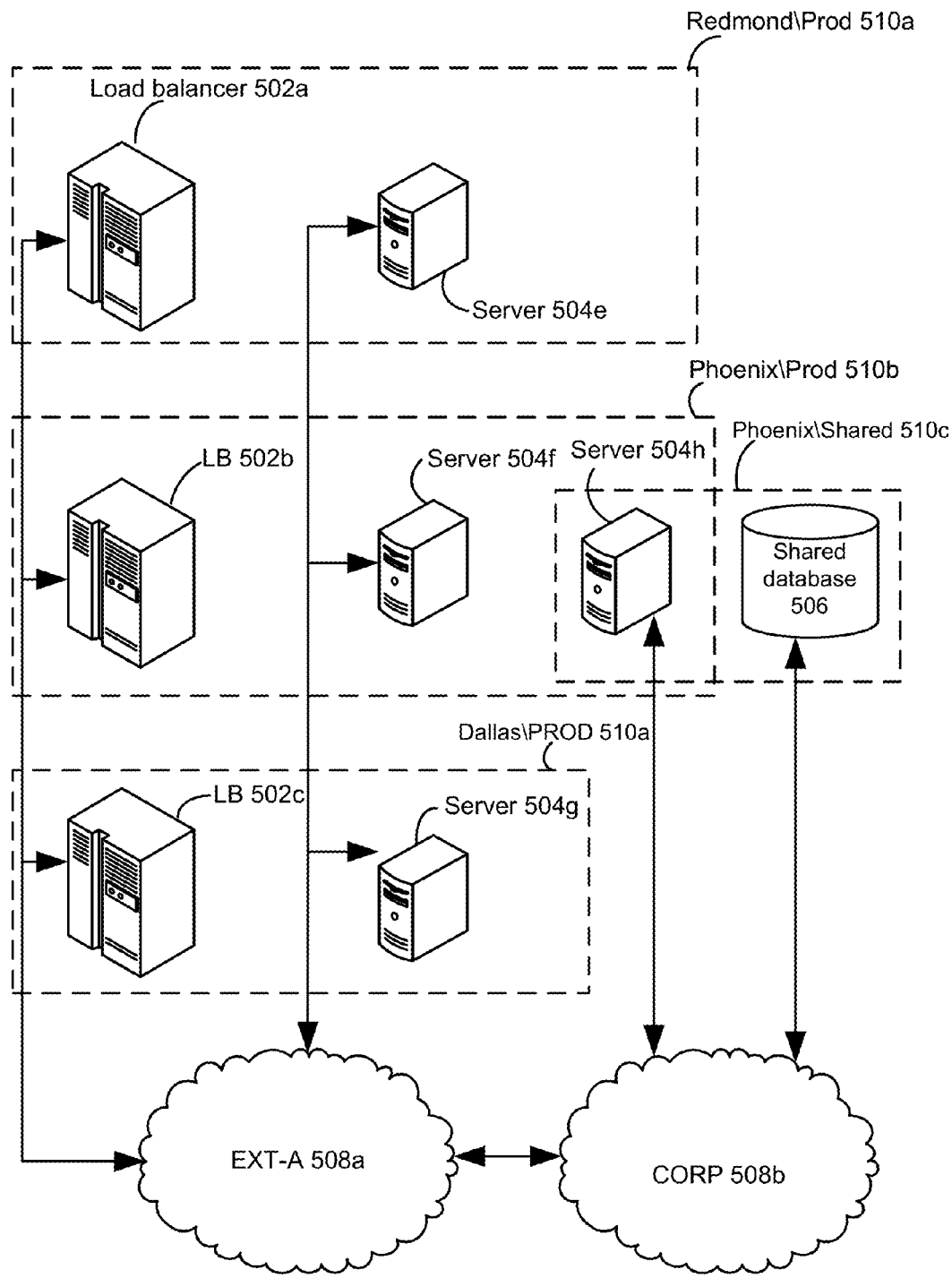
FIG. 7 depicts an example deployment of a service using the service template of FIG. 6.

FIG. 7 depicts an example deployment of a service using the service template of FIG. 6. The service may be deployed to each of the Redmond, Phoenix and Dallas sites so as to provide proximity to users. The production resource groups for each site may be used for the front end servers, and three instances of the servers in each location may be used. The front end servers in each site need access to the back end servers. Phoenix may be determined to be the preferred site for the back end, because it has the lowest communication cost to any other site (as depicted in FIG. 2, Phoenix's cost to communicate with either Redmond or Dallas is 10, whereas Redmond and Dallas have a cost of 20 in communicating with each other). As depicted, there are two instances of the back end server. The shared database may also be established to be in the Phoenix site in the shared resource group.

While deployed, reports and other information about a site or resource group may be determined. These reports may specify all sites within a site or resource group that are grouped by VLAN ID assignments. This information may be used to find a distribution of machines on the various VLANs used. This report may include information of VLAN ID along with the address of the aggregate router where the VLAN is defined; the fully-qualified domain name and IP address of a machine (VM or physical host); a MAC address; and switch and port information.

Another report that may be generated may comprise a list of static IP addresses within a site or resource group along with the service(s) and machines that they are assigned to. Such a report may contain information including a static IP address; a service name; and a fully-qualified domain name and IP address of a machine (VM or physical host). Yet another report that may be generated may comprise a list of load balancers along with VIPs and associated services. Such a report may contain information including a load balancer address; a VIP address, IP address and domain name; a service name; and a fully-qualified domain name and IP address and port of a machine (VM or physical host).

Figure 8:
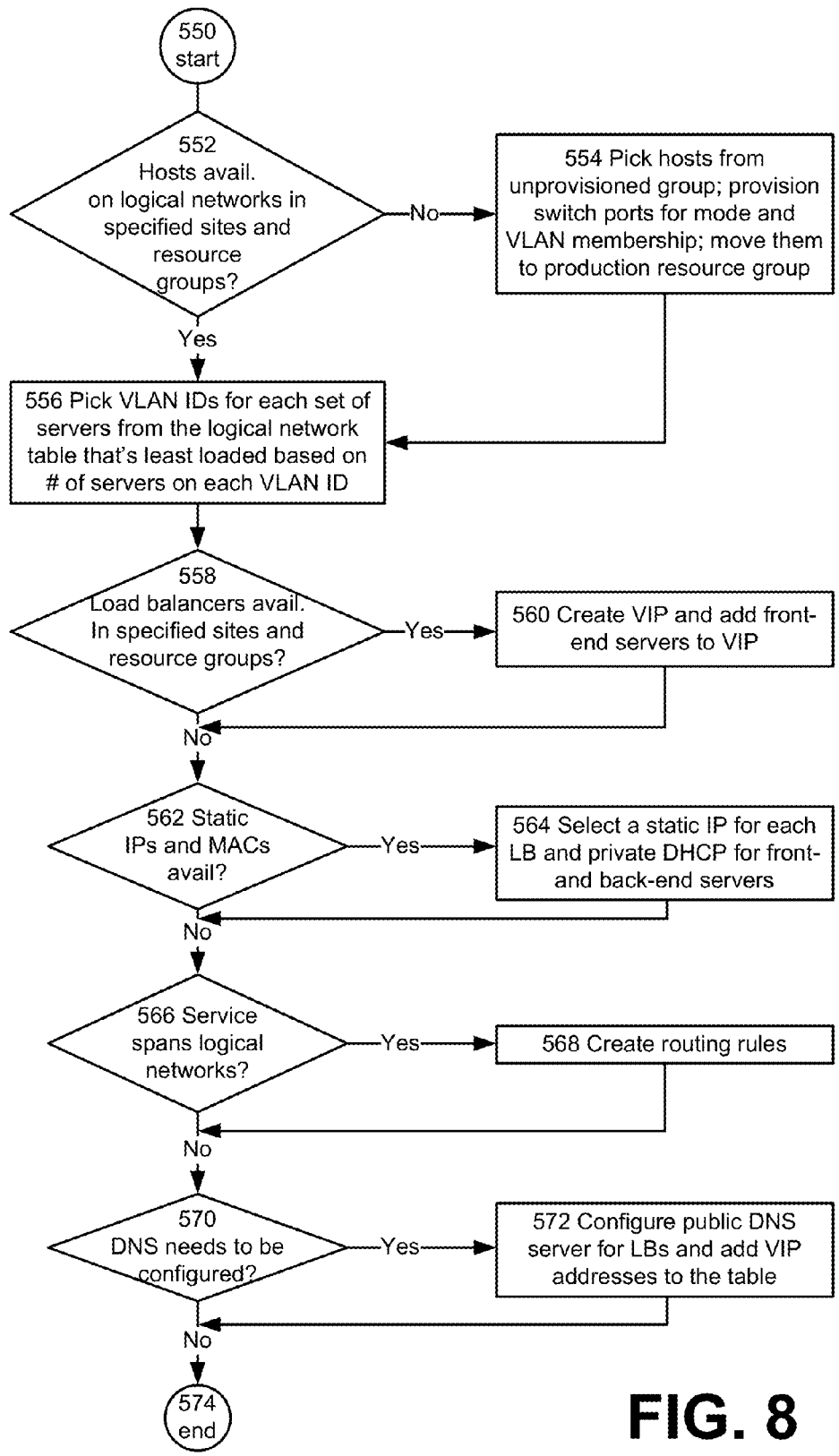
FIG. 8 depicts an example process flow for deploying a service to produce the deployment of FIG. 7, using the service template of FIG. 6 and the physical network of FIGS. 4-5.

FIG. 8 depicts an example process flow for deploying a service to produce the deployment of FIG. 7, using the service template of FIG. 6 and the physical network of FIGS. 4-5. The process flow begins with operation 550. Operation 550 flows to operation 552, where it is determined if there are hosts available on logical networks in the specified sites and resource groups. If no hosts are available on logical networks in the specified sites and resource groups, the process flow moves to operation 554.

At operation 554, hosts are selected from a group of unprovisioned hosts. Those hosts are then provisioned to use the switch ports and VLANs of the production resource group, and moved to the production resource group. After operation 554, or if it is determined at operation 552 that hosts are already available on logical networks in the specified sites and resource groups, the process flow moves to operation 556.

At operation 556, VLAN IDs for each set of servers from the logical network table that are the least loaded based on the number of servers on each VLAN ID are selected. These selected VLAN IDs are assigned to the hosts determined in operation 552 or operation 554. The process flow then moves to operation 558.

In Operation 558, it is determined whether load balancers are available in the specified sites and resource groups. If load balancers are available in the specified sites and resource groups, the process flow moves to operation 560. In operation 560, a VIP is created, and front-end servers are added to that VIP. After operation 560, or if at operation 558 it is determined that no load balancers are available in the specified sites and resource groups, the process flow moves to operation 562.

At operation 562, it is determined if static IP addresses and MAC addresses are available. If static IP addresses and MAC addresses are available, the process flow moves to operation 564. At operation 564, a public static IP address is selected for each load balancer, and a private IP address (determined through DHCP—Dynamic Host Configuration Protocol) is selected for each front-end and back-end server. At the conclusion of operation 564, or if at operation 562 it is determined that no static IP addresses and MAC addresses are available, the process flow moves to operation 566.

At operation 566, it is determined if the service spans logical networks. If the service does span logical networks, the process flow moves to operation 568. At operation 568, routing rules are created to route network traffic between the multiple logical networks. At the conclusion of operation 568, or if at operation 566 it is determined that the service does not span logical networks, the process flow moves to operation 570.

At operation 570, it is determined whether DNS needs to be configured for the load balancer(s). If DNS does need to be configured for the load balancer(s), the process flow moves to operation 572. At operation 572, a public DNS server is configured to include the load balancer(s), and the VIP addresses are added to the table. At the conclusion of operation 572, or if at operation 570 it is determined that DNS does not need to be configured for the load balancer(s), the process flow moves to operation 574. At operation 574, the process flow ends.

Figure 9:
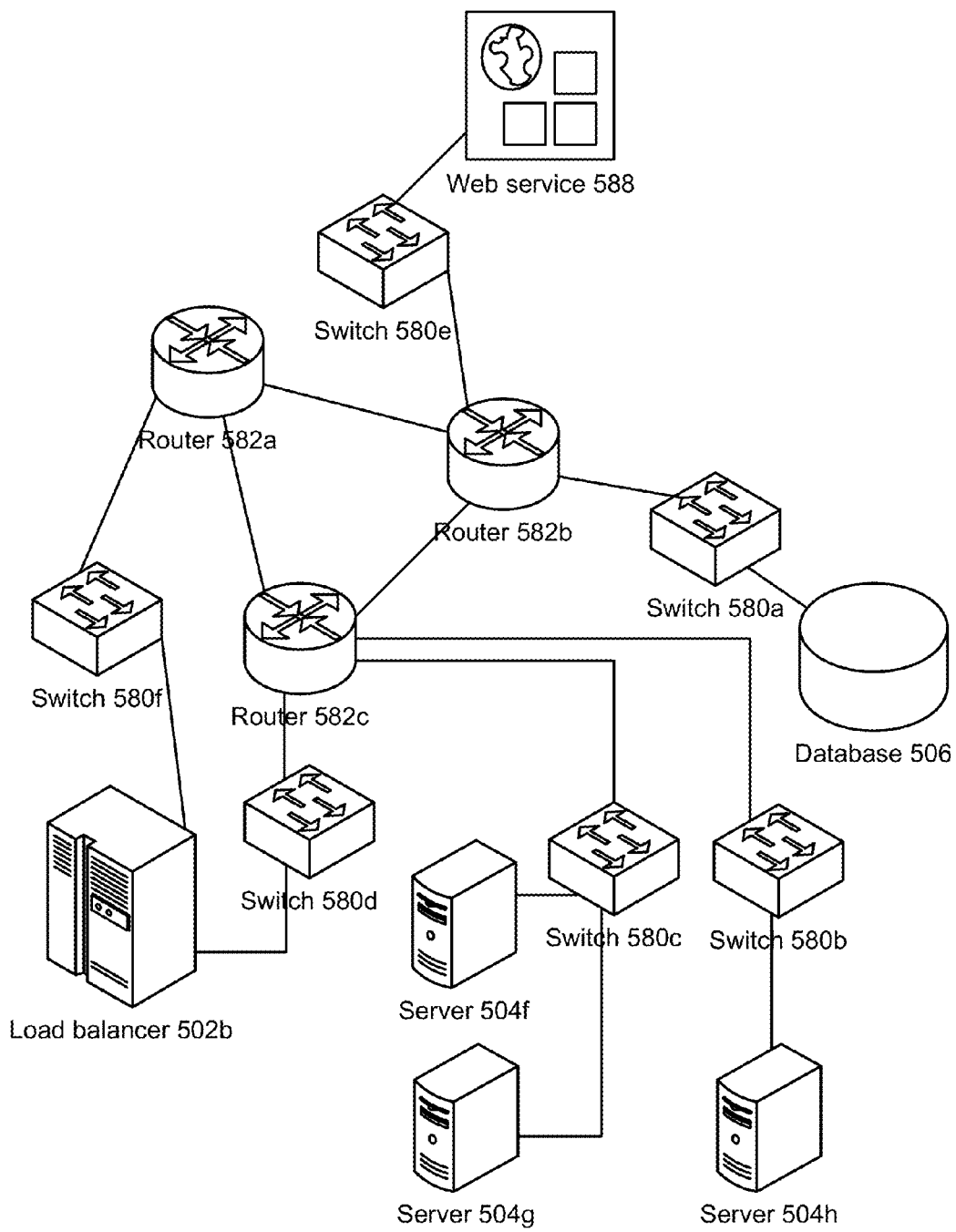
FIG. 9 depicts an example network topology of the deployment of FIG. 7.

FIG. 9 depicts an example network topology of the deployment of FIG. 7. When the service is deployed and running, it may be beneficial to a network administrator if the network topology of the service may be displayed. This network topology may be discovered such as through MOM (manager of managers) network topology discovery to generate a network view. Given two hosts, a network path between those hosts may be determined. MOM filtering capabilities may be used to filter in a subset of network elements, such as routers, switches and firewalls. Tier-1 and Tier-2 servers may be connected via different access switches to the same router, so they are part of the same physical network. There are multiple routes to get from a Tier-2 server to a web service and a shared database. The shortest path has two hops, and the longest path has three hops.

These topology discovery techniques may be extended to provide a set of hosts to the network topology discovery capabilities so that network discovery topology may generate an overall view of the topology. Full network topology may be fairly complex or crowded, so filtering capabilities may be used to filter and include in the displayed topology only a subset of network elements, such as routers, switches and firewalls.

When a service is deployed, monitors may be created to measure network parameters such as available bandwidth and round-trip time (RTT). Monitors may be created between the servers that constitute the service along with monitors to external resources that the service depends on. IF the available bandwidth on any of the interfaces in the path falls below the network service level agreement (SLA), then the service may be moved to a different VLAN ID within the same logical network that does not have the same bottleneck.

In deploying a service, policies may be enforced. For instance, a policy may ensure that the front end servers within each site do not run on the same host. Another policy may ensure that a machine that is connected to the CORP logical network cannot be dual-homed to be connected to the EXT-A logical network, as well.

In deploying a service, redundancy may be provided. For instance, a server that is to be connected to the CORP logical network, and that has multiple physical NICs may be configured such that each physical NIC is configured to CORP. This may be implemented where the same VLAN ID is available on each NIC, and each NIC is connected to a different physical switch. In response to determining that the connection to CORP via one physical NIC has failed (such as due to an alert issued by a network monitoring agent), the binding may be changed to the other physical NIC. This failover may occur on an event that does not rise to a true fail—such as where the bandwidth on the physical NIC's connection falls below a certain threshold. Upon detecting such a failover condition, the v-switch may be bound to the other NIC, since both physical NICs are connected to the same logical network.

As depicted, the network topology of FIG. 9 includes load balancer 502b, servers 504f, 504g, and 504h, and shared database 506, which are also depicted in FIG. 7. The network topology of FIG. 9 may also include load balancers 502a and 502c, and server 504e as depicted in FIG. 7, though those elements have been omitted from the network topology of FIG. 9 for reasons of clarity. The network topology of FIG. 9 also includes routers switches 580a-f, routers 582a-c, and webservice front end to the service 588.

It may be noted that in the example deployment depicted in FIG. 7, load balancer 502b and server 504f are merely connected through logical network EXT-A 508a. The underlying network topology depicted in FIG. 9 shows that the physical network infrastructure between these two computers is more complicated. Where load balancer 502b sends a communication to server 504f, this communication passes through switch 580d, to router 582d and to switch 580c before reaching server 504f. Similarly, whereas both server 504h and shared database 506 are depicted in FIG. 7 as being part of the CORP 508b logical network, the network topology of FIG. 9 shows that if server 504f is to communicate with shared database 506, it must send a communication through switch 580c, to router 582c, to router 582b (and possibly router 582a as an intermediary step), and to switch 580a, where it is sent to shared database 506.

A network topology for a logical network may comprise redundant routes. For instance, load balancer 502b may be configured to communicate with router 582a via either switch 580f or switch 580d and router 582c. Redundant routes may be established so that there is no single point of failure. If there is a failure in one route, then a service may use another route. In such a scenario, this may be set up by configuring multiple NICs on a single host to be connected to different switches while also being on the same logical network, so that the NICs take different routes and there is redundancy built into the network. Then, when a service is deployed on the host, it may be determined that the same VLAN ID is available on multiple NICs connected to different physical switches. Then, a V-NIC (virtual NIC) and V-switch (virtual switch) for the logical network may be bound to one NIC and the connection may be monitored. If there is a failure on the network, the binding of the V-NIC and V-switch may be changed to another NIC. A similar switch over may occur due to less than actual failure, such as the bandwidth of the connection dropping below a certain level.

Figure 10:
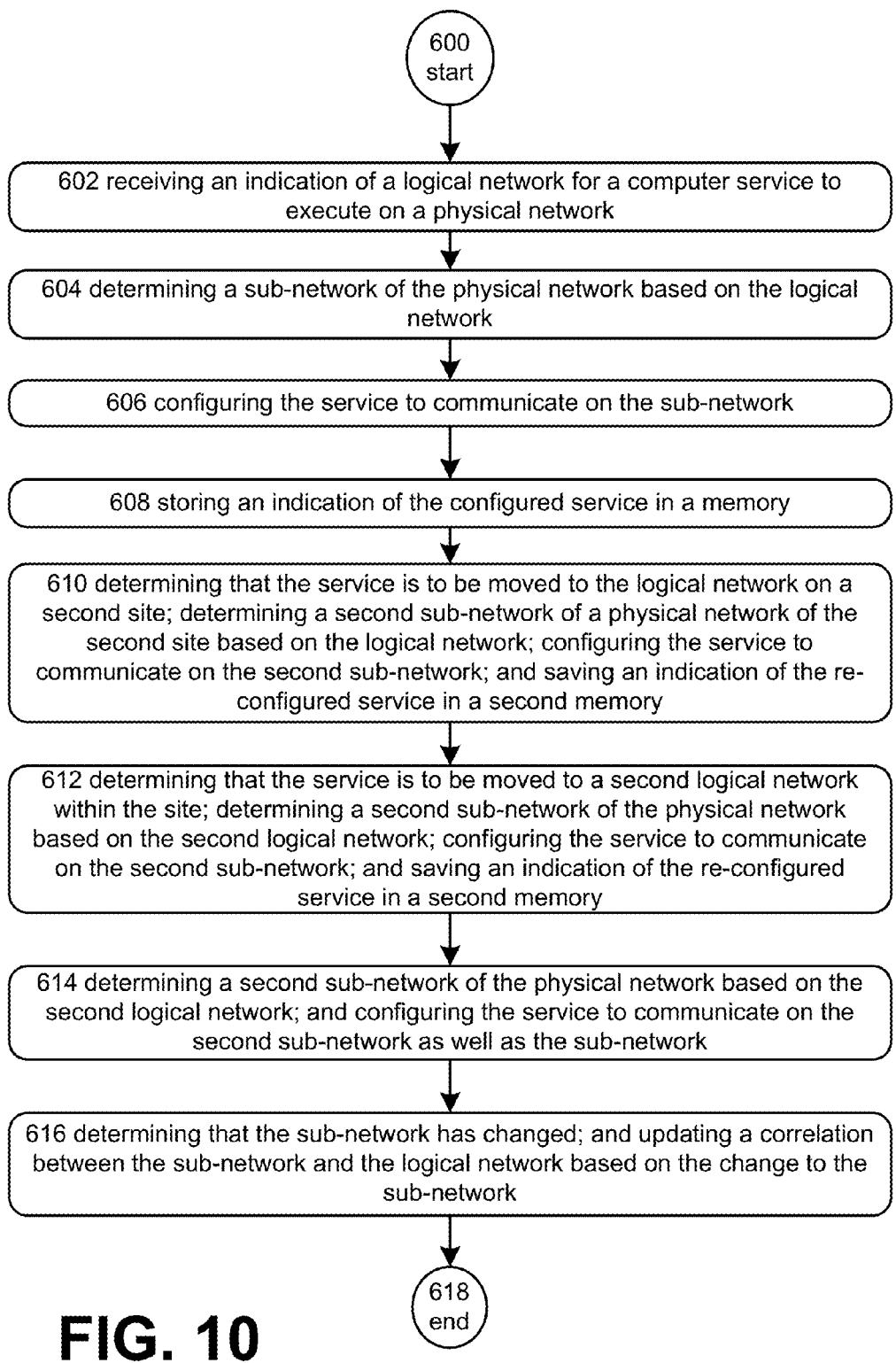
FIG. 10 depicts example operational procedures for creating logical networks and mapping logical networks to physical networks.

FIG. 10 depicts example operational procedures for creating logical networks and mapping logical networks to physical networks. The operational procedures of FIG. 10 may be used to create the logical networks of FIG. 5 based on the physical network of FIG. 4, and then to deploy a service to a physical network based on deploying the service to a corresponding logical network, as depicted in FIGS. 6-9.

The process flow begins with operation 600. Operation 600 leads into operation 602, which depicts receiving an indication of a logical network for a computer service, the computer service to execute on a physical network. As discussed with respect to FIG. 6, a service may be assigned to one or more logical networks As depicted in FIG. 6, the service that executes on load balancer 502, servers 504a-d and shared database 506 executes on logical networks EXT-A 508a and CORP 508b.

A logical network may comprise permission to access a resource, or an amount of bandwidth available. There may be some resources that are available only from certain logical networks. For instance, a back-end database that should not be accessible from the INTERNET may be available only to computers that are on logical networks that do not have direct access to the INTERNET (such as CORP 508b), and so only a computer on such a logical network may have permission to access that back-end database resource. A second aspect that a logical network may comprise is an amount of available bandwidth. Different logical networks may carry with them differing amounts of available bandwidth. For instance, a particular logical network may be intended for use by services that have high bandwidth requirements (such as a service that serves a great deal of data to external clients).

A logical network may be part of a site, the site comprising: a virtual local area network identifier (VLAN ID) and a port that is used to transmit communications. As depicted in FIG. 4, host 402a, which is part of a site, is configured to use VLAN ID 6 on ports 1-3, and VLAN ID 8 on ports 6-8. Where host 402a is part of a particular logical network, that logical network may then be configured to use VLAN ID 6 on ports 1-3, and VLAN ID 8 on ports 6-8, just as the site is.

Operation 604 depicts determining a sub-network of the physical network based on the logical network. A physical network may comprise multiple sub-networks, which comprise a subset of the available IP addresses (such as an IP address and an associated subnet mask—e.g. 192.168.1.1/21) of the physical network, along with associated VLAN IDs and ports. Where a logical network is mapped to a sub-network for the physical network, operation 604 comprises determining this mapped relationship. A logical network may exist on multiple sites, but the mapping between that one logical network and the corresponding physical sub-network for each site may vary. For instance, a CORP logical network for Redmond site 202a of FIG. 2 may comprise the IP address range 172.16.0.1/24, whereas that same CORP logical network for the Dallas site 202c may comprise a different IP address range, such as 207.46.84.0/22.

In an embodiment, determining a sub-network of the physical network based on the logical network comprises: determining information about a host of the physical network based on information stored by a router of the physical network. This may comprise utilizing network discovery capabilities, such as those described with respect to FIG. 4. Information about the host that is determined may comprise an IP address or a virtual local area network identifier (VLAN ID) of the host.

Operation 606 depicts configuring the service to communicate on the sub-network. This may comprise operations such as selecting load balancers and hosts on the sub-network that are available to handle the processing requirements of the service, and configuring the service itself with networking information of the sub-network, such as an IP address, VLAN, or port of the sub-network.

In an embodiment where operation 604 comprises determining a virtual local area network identifier (VLAN ID) for the service; and determining that a host of the sub-network is configured to communicate with the VLAN ID for the service; operation 606 comprises configuring the service to execute on the host. Hosts within a sub-network may not all be configured to use the same VLAN IDs. Where the service is going to be deployed to a particular host, the service may be configured to use one of the VLAN IDs of the sub-network that this particular host is configured to use.

In an embodiment, operation 606 comprises: selecting a machine from a plurality of machines on the sub-network based on a load of the machine. There may be multiple hosts or machines within a sub-network that the service may be deployed on. In this scenario, it may be advantageous to select one of these hosts based on which one has the greatest available load, or an available load greater than a given threshold. There are other techniques for selecting a host for a service, such as round-robin, where each host is used in order, and once each host has been used, the technique returns to the first host, and uses the first host for the next task.

Operation 608 depicts storing an indication of the configured service in a memory. Once the service has been configured to be deployed on a physical network based on being assigned to the logical network, or has been deployed to the physical network, an indication of this configured service may be stored in a memory. This may comprise storing an indication or other information of how the service is configured in a centralized location, or storing the various parts of the configured service in a respective memory of each computer of the physical network to which the service is deployed.

Operation 610 depicts determining that the service is to be moved to the logical network on a second site; determining a second sub-network of a physical network of the second site based on the logical network; configuring the service to communicate on the second sub-network; and saving an indication of the re-configured service in a second memory. As discussed previously, multiple sites may have the same logical network abstraction—such as CORP or PRODUCTION—but the way that that logical network is mapped to the underlying physical network of a given site may differ. For instance, a CORP logical network for Redmond site 202a of FIG. 2 may comprise the IP address range 172.16.0.1/24, whereas that same CORP logical network for the Dallas site 202c may comprise a different IP address range, such as 207.46.84.0/22. Where the service is moved from a first site to a second site (such as from Redmond site 202a to Dallas site 202c) the sub-network of this second site—the second sub-network, above—may be determined for the service and the service may be configured to operate on this second sub-network.

Operation 612 depicts determining that the service is to be moved to a second logical network within the site; determining a second sub-network of the physical network based on the second logical network; configuring the service to communicate on the second sub-network; and saving an indication of the re-configured service in a second memory. A service may be moved from a first site to a second site, as described with respect to operation 610, and it may even be moved between logical networks within a site, such as from Redmond\TEST to Redmond\PRODUCTION. Where the service is moved from between logical networks within a site, the sub-network of this second logical network—the second sub-network, above—may be determined for the service and the service may be configured to operate on this second sub-network.

Operation 614 depicts—where receiving an indication of a logical network for a computer service to execute on a physical network comprises receiving an indication of a second logical network for the computer service to execute on the physical network—determining a second sub-network of the physical network based on the second logical network; and configuring the service to communicate on the second sub-network as well as the sub-network. A single service may be configured to be deployed across multiple logical networks. For example, the service depicted in FIG. 6 is configured to be partially deployed to logical network EXT-A 508a (the components that execute upon load balancer 502, and servers 504a-c), and to be partially deployed to logical network CORP 508b (the components that execute upon server 504d and shared database 506).

Operation 616 depicts determining that the sub-network has changed; and updating a correlation between the sub-network and the logical network based on the change to the sub-network. The characteristics of a sub-network may change—for instance, the number of VLANs or the VLAN IDs may be modified. Where such a change is made to the underlying physical network of a logical network, the correlation or mapping of a logical network may be updated. Where a service running on the sub-network is affected by the change (such as it is configured to use a VLAN ID that the network no longer has), the service may be re-deployed or otherwise modified or updated so that it is configured to be deployed on the changed sub-network.

The process flow of FIG. 10 concludes at operation 618.

Conclusion

While the present invention has been described in connection with the preferred aspects, as illustrated in the various figures, it is understood that other similar aspects may be used or modifications and additions may be made to the described aspects for performing the same function of the present invention without deviating there from. Therefore, the present invention should not be limited to any single aspect, but rather construed in breadth and scope in accordance with the appended claims. For example, the various procedures described herein may be implemented with hardware or software, or a combination of both. Thus, the methods and apparatus of the disclosed embodiments, or certain aspects or portions thereof, may take the form of program code (i.e., instructions) embodied in tangible media, such as floppy diskettes, CD-ROMs, hard drives, or any other machine-readable storage medium. When the program code is loaded into and executed by a machine, such as a computer, the machine becomes an apparatus configured for practicing the disclosed embodiments. In addition to the specific implementations explicitly set forth herein, other aspects and implementations will be apparent to those skilled in the art from consideration of the specification disclosed herein. It is intended that the specification and illustrated implementations be considered as examples only.

What is claimed:

1. A method, comprising:

receiving, by one or more computers, across a plurality of sites, an indication of a first and second logical network for a computer service, the computer service to communicate via a first or second physical network;

determining, at a first one of the plurality of sites, by the one or more computers, a first sub-network of the first physical network and a first host of the first sub-network based on determining a virtual local area network identifier (VLAN ID) of the first logical network, and determining that the first host of the first sub-network is configured to communicate with the VLAN ID of the first logical network;

determining, at a second one of the plurality of sites, by the one or more computers, a second sub-network of the second physical network and a second host of the second sub-network based on determining a VLAN ID of the second logical network, and determining that the second host of the second sub-network is configured to communicate with the VLAN ID of the second logical network;

configuring, by the one or more computers, the computer service to execute on the first or second host and to communicate via the first or second sub-network based on determining movement of the computer service to the first or second site; and saving, by the one or more computers, an indication of the configured computer service in a memory.

2. The method of claim 1, wherein the first and second sub-network comprises an Internet Protocol (IP) address and an associated subnet mask.

3. The method of claim 1, wherein determining the first and second sub-network of the first and second physical network based on the first and second logical network comprises:

determining information about the first and second host of the first and second physical network based on information stored by a router of the first and second physical network.

4. The method of claim 3, wherein the information about the first and second host comprises:

an Internet Protocol (IP) address of the first and second host.

5. The method of claim 3, wherein the information about the first and second host comprises:

a VLAN ID of the first and second host.

6. The method of claim 1, wherein the first and second logical network comprises:

a permission to access a resource.

7. The method of claim 1, wherein the first and second logical network comprises:

an amount of network bandwidth available via the first and second logical network.

8. A system, comprising:

a memory bearing instructions that, upon execution by a processor, cause the system at least to:

receive, across a plurality of sites, an indication of a first and second logical network for a computer service, the computer service to communicate via a first or second physical network;

determine, at a first one of the plurality of sites, a first sub-network of the first physical network and a first host of the first sub-network based on determining a virtual local area network identifier (VLAN ID) of the first logical network, and determining that the first host of the first sub-network is configured to communicate with the VLAN ID of the first logical network;

determine, at a second one of the plurality of sites, a second sub-network of the second physical network and a second host of the second sub-network based on determining a VLAN ID of the second logical network, and determining that the second host of the second sub-network is configured to communicate with the VLAN ID of the second logical network; and configure the computer service to execute on the first or second host and to communicate via the first or second sub-network based on determining movement of the computer service to the first or second site.

9. The system of claim 8, wherein the instructions that, upon execution by the processor, cause the system to at least configure the computer service to communicate via the first or second sub-network further cause the system at least to:

select a machine for the computer service to execute upon from a plurality of machines on the first or second sub-network based on a load of the machine.

10. The system of claim 8, wherein the memory further bears instructions that, upon execution by the processor, cause the system at least to:

determine that the first or second sub-network has changed; and update a correlation between the first or second sub-network and the first or second logical network based on the change to the first or second sub-network.

11. A computer-readable storage device bearing computer-readable instructions that, upon execution by a computer, cause the computer to perform operations comprising:

receiving, across a plurality of sites, an indication of a first and second logical network for a computer service, the computer service to communicate via a first or second physical network;

determining, at a first one of the plurality of sites, a first sub-network of the first physical network and a first host of the first sub-network based on determining a virtual local area network identifier (VLAN ID) of the first logical network, and determining that the first host of the first sub-network is configured to communicate with the VLAN ID of the first logical network;

determining, at a second one of the plurality of sites, a second sub-network of the second physical network and a second host of the second sub-network based on determining a VLAN ID of the second logical network, and determining that the second host of the second sub-network is configured to communicate with the VLAN ID of the second logical network; and configuring the computer service to execute on the first or second host and to communicate via the first or second sub-network based on determining movement of the computer service to the first or second site.

12. The computer-readable storage device of claim 11, wherein determining the first and second sub-network of the first and second physical network based on the first and second logical network comprises:

determining information about the first and second host of the first and second physical network based on information stored by a router of the first and second physical network.

13. The computer-readable storage device of claim 11, wherein configuring the computer service to communicate via the first or second sub-network further comprises:

selecting a machine for the computer service to execute upon from a plurality of machines on the first or second sub-network based on a load of the machine.

14. The computer-readable storage device of claim 11, further bearing computer-readable instructions that, upon execution by the computer, cause the computer to perform operations comprising:

determining that the first or second sub-network has changed; and updating a correlation between the first or second sub-network and the first or second logical network based on the change to the first or second sub-network.

* * * * *